US007826083B2

(12) United States Patent
Nakamura

(10) Patent No.: US 7,826,083 B2
(45) Date of Patent: Nov. 2, 2010

(54) MANAGEMENT OF MULTIPLE PAGE DESCRIPTION LANGUAGES

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1095 days.

(21) Appl. No.: 11/514,187

(22) Filed: Sep. 1, 2006

(65) Prior Publication Data

US 2007/0053000 A1 Mar. 8, 2007

(30) Foreign Application Priority Data

Sep. 2, 2005 (JP) .............................. 2005-255618

(51) Int. Cl.
G06F 3/12 (2006.01)
(52) U.S. Cl. .................... 358/1.15; 358/1.13; 358/1.18; 719/321; 719/327; 399/79; 399/80
(58) Field of Classification Search ................ 358/1.15; 399/79–80; 719/321, 327
See application file for complete search history.

(56) References Cited

U.S. PATENT DOCUMENTS

| 5,768,516 | A * | 6/1998 | Sugishima | 709/217 |
| 5,924,802 | A * | 7/1999 | Sakurai | 400/61 |
| 6,210,051 | B1 | 4/2001 | Sakurai | |
| 6,336,151 | B1 * | 1/2002 | Seki | 710/8 |
| 6,667,812 | B1 | 12/2003 | Sato et al. | |
| 6,823,526 | B2 * | 11/2004 | Howard et al. | 719/327 |
| 6,930,791 | B2 * | 8/2005 | Jackelen | 358/1.15 |
| 7,086,794 | B2 | 8/2006 | Fujimaki et al. | |
| 7,210,868 | B2 | 5/2007 | Fujimaki et al. | |
| 7,551,304 | B2 * | 6/2009 | Oomura | 358/1.15 |
| 2002/0118382 | A1 * | 8/2002 | Jackelen | 358/1.13 |
| 2005/0108705 | A1 | 5/2005 | Koyama | |
| 2005/0200889 | A1 * | 9/2005 | Oomura | 358/1.15 |
| 2006/0215198 | A1 * | 9/2006 | Yorimoto | 358/1.13 |
| 2006/0227361 | A1 | 10/2006 | Sakurai | |
| 2007/0053000 | A1 | 3/2007 | Nakamura | |
| 2007/0064268 | A1 * | 3/2007 | Hino | 358/1.15 |
| 2007/0076247 | A1 * | 4/2007 | Mori | 358/1.15 |
| 2009/0109464 | A1 * | 4/2009 | Knodt | 358/1.15 |

FOREIGN PATENT DOCUMENTS

| JP | 6332635 | A | 12/1994 |
| JP | 8002067 | A | 1/1996 |
| JP | 9267538 | | 10/1997 |
| JP | 11312061 | A | 11/1999 |
| JP | 2002229751 | A | 8/2002 |
| JP | 2004230823 | | 8/2004 |
| JP | 2005141366 | A | 6/2005 |

OTHER PUBLICATIONS

Japanese Office Action dated Jun. 21, 2010 in corresponding Japanese Application No. 2005-255618.

* cited by examiner

Primary Examiner—Twyler L Haskins
Assistant Examiner—Dennis Dicker
(74) Attorney, Agent, or Firm—Fitzpatrick, Cella, Harper & Scinto

(57) ABSTRACT

An image forming apparatus decides, in response to an information request transmitted from an information processing apparatus, a priority image forming unit from a plurality of image forming units in accordance with the states of image forming units. The image forming apparatus transmits identification information containing an identifier of the decided image forming unit.

5 Claims, 19 Drawing Sheets

FIG. 2

| TAG | VALUE |
|---|---|
| CLS | PRINTER |
| MFG | ABC |
| MDL | LBP-XXX PDL1 |
| CMD | PDL1, IEEE1284 |

```
<Probe>
        <Types>PrintService</Types>
</Probe>
```

```
<Metadata>
    <Service>
        <EndpointReference>
            <Address>http://192.168.0.1/print</Address>
        </EndpointReference>
        <Types>PrintService</Types>
        <ServiceId>1</ServiceId>  ~901
    </Service>
    <Service>
        ...
    </Service>
</Metadata>
```

FIG. 11

```
<Metadata>
  <PrinterMetadata>
    <PrinterName>Printer in Copy Room</PrinterName>
    <DeviceId>CLS:PRINTER;MFG:ABC;MDL:LBP-XXX PDL1;CMD:PDL1,IEEE1284</DeviceId>
  </PrinterMetadata>
</Metadata>
```

FIG. 12

| SERVICE ID | SERVICE |
|---|---|
| 1 | PrintService/PDL1 |
| 2 | PrintService/PDL2 |

FIG. 16

| HOST IP | PDL DESIGNATED IN SEARCH |
|---|---|
| 192.168.0.2 | PDL1 |
| 192.168.0.3 | PDL1 |

MANAGEMENT OF MULTIPLE PAGE DESCRIPTION LANGUAGES

BACKGROUND OF THE INVENTION

1. Field of the Invention

The present invention relates to an image forming apparatus which is connected to a network and is communicable with an information processing apparatus on the network, a control method therefor, a program, and an image forming system including the image forming apparatus and information processing apparatus.

2. Description of the Related Art

Conventionally, image forming apparatuses (e.g., printers and multifunction peripherals) that are connected to a network and receive an operation from a computer through the network are used. Some of the image forming apparatuses can extend PDLs (Page Description Languages) processable in the apparatus later to support a plurality of PDLs.

When a device serving as a peripheral device is connected to an information processing apparatus such as a host computer, the device can transmit device information containing the model name and maker name to the information processing apparatus. Upon receiving the device information, the information processing apparatus can refer to the device ID in the device information and selectively install a device driver specified by the device ID. This technique is called "plug and play".

Printer driver installation processing by general plug and play will be described with reference to FIG. 1.

Referring to FIG. 1, a general personal computer (PC) or workstation is used as a host computer, i.e., an example of an information processing apparatus 100. Assume that a plurality of driver sets 101 to 103 are stored in the information processing apparatus 100 in advance as drivers packaged in the operating system (OS) of the apparatus.

Each of the driver sets 101 to 103 includes an INF file 104 that describes unique information to be referred to in installing the driver, various kinds of execution modules 105, and resources 106. A device ID is described in the INF file 104. The device ID is formed from the value of an MFG tag as a maker name and the value of an MDL tag as a product name in device information received upon plug and play.

The device ID is used as an identifier to make an image forming apparatus (printer) accurately correspond to a device driver at the time of installation. When the information processing apparatus 100 is connected to an image forming apparatus 107 through a communication medium 108 such as USB, the image forming apparatus 107 detects the connection. After detecting the connection, the image forming apparatus 107 transmits, to the information processing apparatus 100 through the communication medium 108, device information 109 defined by IEEE1284 and containing unique information of the image forming apparatus 107. The device information 109 defined by IEEE1284 contains pieces of information shown in FIG. 2.

Upon receiving the device information 109, the OS in the information processing apparatus 100 reads out the CLS tag from the device information 109, detects that the target of plug and play is the image forming apparatus 107, and starts installing a corresponding driver set. The OS generates a device ID including the MFG tag and MDL tag in the device information 109 and searches for a driver set with the INF file 104 containing the device ID from the driver sets 101 to 103.

When the driver set corresponding to the device information 109 is found, the various kinds of execution modules 105 and resources 106 in the driver set are installed in the OS. The installed driver set is connected to a port of the communication medium 108 that has received the device information 109. If no corresponding driver set is present in the information processing apparatus 100, the processing is ended without installation.

The device information shown in FIG. 2 will be described.

The format of the device information shown in FIG. 2 includes a "tag" column representing tag names and a "value" column representing possible tag values. A CLS tag stores "PRINTER" as its value. The CLS tag stores the apparatus type as its value. In this case, this tag indicates that the connected peripheral device is an image forming apparatus.

An MFG tag stores "ABC" as its value. The MFG tag indicates the maker name. That is, it indicates that ABC is the maker. An MDL tag stores "LBP-XXX PDL1" as its value. The MDL tag indicates the model name and PDL type. In this case, this tag indicates that the model of the peripheral device is LBP-XXX, and the PDL type is PDL1.

A CMD tag stores "PDL1, IEEE1284" as its value. The value of the CMD tag includes the command and PDL name to be transmitted/received through the communication medium. In this case, this tag indicates that the peripheral device would transmit/receive a command group PDL1 as the PDL type by using IEEE1284 as the communication medium type.

In the information processing apparatus 100 that has received the device information 109 shown in FIG. 2, the OS generates a device ID "ABC LBP-XXX PDL1" for the values of the MFG and MDL tags. A driver set is searched by using the device ID as a key.

Plug-and-play techniques using a local interface such as USB or a network interface such as LAN are also proposed. Examples are SOAP (Simple Object Access Protocol)-based Web service protocols called WS-Discovery and WS-MetadataExchange.

The information processing apparatus can detect the presence of a device on the network and acquire device information from the detected device by using these techniques. Hence, the driver of the device on the network can be installed by the same plug and play as in the local interface.

A technique of causing an optional device attached to a device to change the device ID to change its display in a printer driver on an information processing apparatus has already been proposed (Japanese Patent Application Laid-Open No. 2004-230823).

A technique of notifying an information processing apparatus of a device ID that changes in accordance with the change of an extension unit to extend the function of a printer device and causing the information processing apparatus to select a device driver corresponding to the device ID has also been proposed (Japanese Patent Application Laid-Open No. 9-267538).

However, the above-described conventional techniques install a plurality of drivers even on an information processing apparatus when an image forming apparatus has a plurality of PDLs. In most cases, although a general user uses a PDL with little concern for its type in printing, the information processing apparatus installs a plurality of drivers. This may confuse the user.

Additionally, when the device administrator adds PDLs to an image forming apparatus later, he/she wants a user to use a PDL added later. In spite of this intention, a PDL device driver originally installed in the information processing apparatus may serve as the standard driver.

SUMMARY OF THE INVENTION

The present invention has been made to solve the above problems, and has as its object to provide an image forming apparatus capable of causing an information processing apparatus to install a driver desired by a user by selecting an appropriate PDL and presenting device information to the information processing apparatus, and increasing the convenience for the user, a control method of the apparatus, and a program.

According to the present invention, the foregoing object is attained by providing an image forming apparatus which is connected to a network and can communicate with an information processing apparatus on the network, comprising:

a plurality of image forming means;

decision means for deciding priority image forming means from the plurality of image forming means in accordance with states of image forming means; and transmission means for transmitting, in response to an information request transmitted from the information processing apparatus, identification information containing an identifier of the image forming means decided by the decision means.

In a preferred embodiment, the decision means decides, as priority image forming means from the plurality of image forming means, image forming means which is added and extended to the image forming apparatus as an option.

In a preferred embodiment, the apparatus further comprises designation means for designating priority image forming means from the plurality of image forming means, wherein the decision means decides, as priority image forming means from the plurality of image forming means, the image forming means designated by the designation means.

In a preferred embodiment, the apparatus further comprises:

reception means for receiving a search request from the information processing apparatus; and response means for interpreting a type designated by the search request and making a response only when the image forming apparatus includes the type.

In a preferred embodiment, the apparatus further comprises:

storage means for, if the type designated by the search request indicates a type of the image forming means, storing correspondence information representing a correspondence between type information representing the designated type and identification information representing an information processing apparatus which has transmitted the search request, wherein if an information processing apparatus which has transmitted the information request exists in the correspondence information stored in the storage means, the decision means decides, as priority image forming means from the plurality of image forming means, image forming means with a type corresponding to identification information of the information processing apparatus.

In a preferred embodiment, the apparatus further comprises storage means for storing, for each image forming means of the plurality of image forming means, use log information of image forming means used in printing a print job transmitted from the information processing apparatus, wherein the decision means decides priority image forming means from the plurality of image forming means on the basis of the use log information stored in the storage means.

In a preferred embodiment, the decision means refers to the use log information to decide most frequently used image forming means as priority image forming means from the plurality of image forming means.

According to the present invention, the foregoing object is attained by providing an image forming system formed by connecting an image forming apparatus to an information processing apparatus through a network, wherein the image forming apparatus comprises a plurality of image forming means, decision means for deciding priority image forming means from the plurality of image forming means in accordance with states of image forming means, and transmission means for transmitting, in response to an information request transmitted from the information processing apparatus, identification information containing an identifier of the image forming means decided by the decision means; and the information processing apparatus comprises reception means for receiving the identification information from the image forming apparatus, and installation means for installing, on the basis of the identification information received by the reception means, a device driver to use the image forming apparatus.

According to the present invention, the foregoing object is attained by providing a control method of an image forming apparatus which is connected to a network and can communicate with an information processing apparatus on the network, comprising:

a decision step of deciding, in accordance with states of image forming means, priority image forming means from a plurality of image forming means provided in the image forming apparatus; and a transmission step of transmitting, in response to an information request transmitted from the information processing apparatus, identification information containing an identifier of the image forming means decided in the decision step.

According to the present invention, the foregoing object is attained by providing a program stored in a computer-readable medium, which causes a computer to execute control of an image forming apparatus which is connected to a network and can communicate with an information processing apparatus on the network, causing the computer to execute:

a decision step of deciding, in accordance with states of image forming means, priority image forming means from a plurality of image forming means provided in the image forming apparatus; and a transmission step of transmitting, in response to an information request transmitted from the information processing apparatus, identification information containing an identifier of the image forming means decided in the decision step.

According to the present invention, the foregoing object is attained by providing an image forming apparatus which is connected to a network and can communicate with an information processing apparatus on the network, comprising:

first image forming means;

addition means for allowing to add and use second image forming means;

decision means for deciding priority image forming means from a plurality of image forming means in accordance with states of image forming means; and transmission means for transmitting, in response to an information request transmitted from the information processing apparatus, identification information containing an identifier of the image forming means decided by the decision means.

According to the present invention, the foregoing object is attained by providing an image forming apparatus which is connected to a network and can communicate with an information processing apparatus on the network, comprising:

first image forming means;

addition means for allowing to add and use second image forming means;

setting means for, when the addition means allows to add and use the second image forming means, setting the second image forming means of a plurality of image forming means; and transmission means for transmitting, in response to an information request transmitted from the information processing apparatus, identification information containing an identifier of the image forming means set by the setting means.

In a preferred embodiment, when the addition means does not allow to add and use the second image forming means, the setting means sets the first image forming means out of the plurality of image forming means.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a view for explaining device information defined by IEEE1284;

FIG. 9 is a view showing an example of device information according to the first embodiment of the present invention;

FIG. 11 is a view showing an example of service information according to the first embodiment of the present invention;

FIG. 12 is a view showing an example of service name information according to the first embodiment of the present invention;

FIG. 16 is a view showing an example of search log information according to the second embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically started otherwise.

First Embodiment

Figure 1:
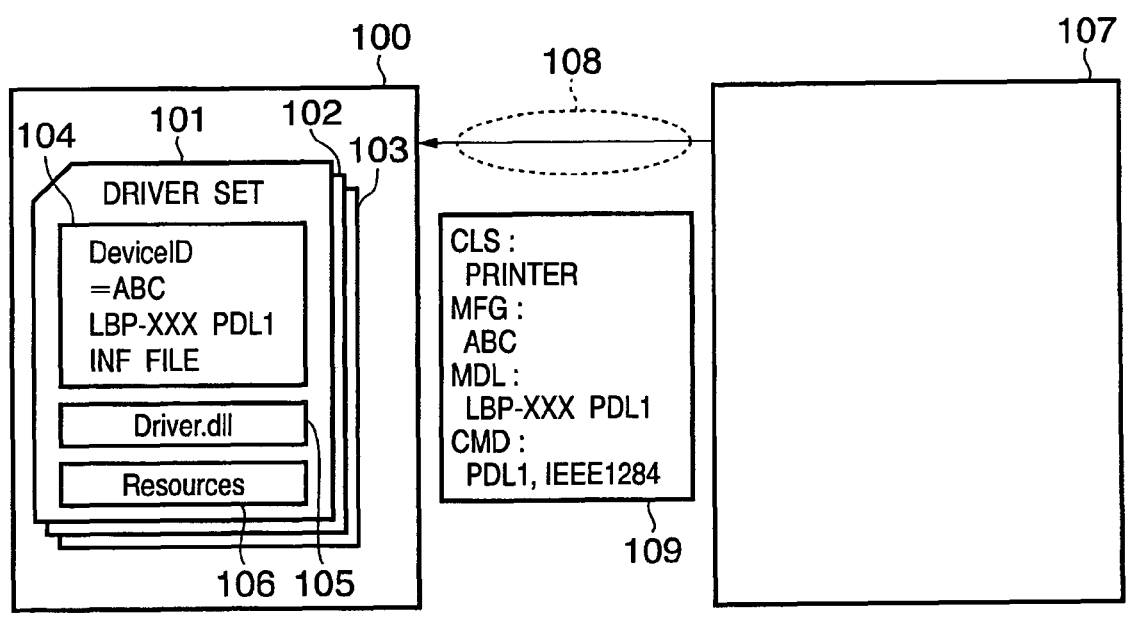
FIG. 1 is a view for explaining printer driver installation processing using plug and play.
Figure 3:
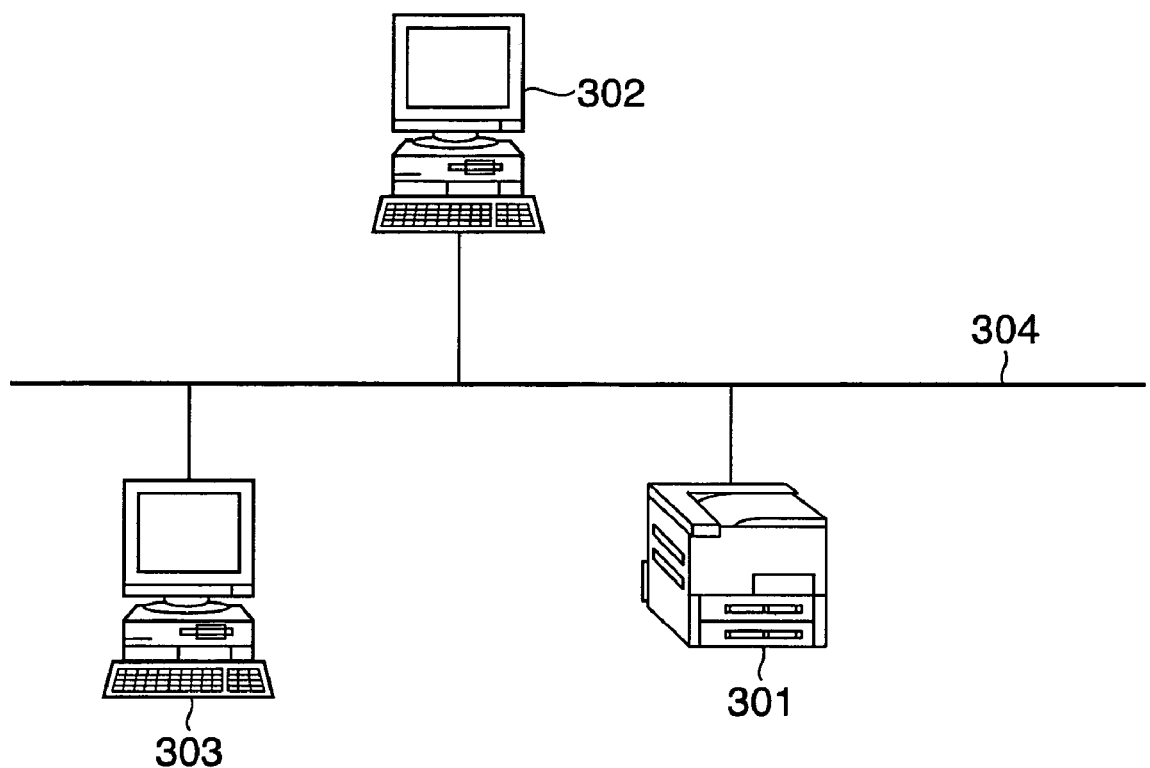
FIG. 3 is a view showing a configuration example of an image forming system according to the first embodiment of the present invention.

FIG. 3 is a view showing a configuration example of an image forming system according to the first embodiment of the present invention.

In the image forming system shown in FIG. 3, a device 301 and host computers 302 and 303 are connected to each other through a network 304.

The network 304 is a so-called communication network that is typically implemented by one of the Internet, LAN, WAN, telephone line, dedicated digital line, ATM, frame relay line, communication satellite channel, cable TV line, and data broadcast channel or a combination thereof. The network 304 only needs to transmit/receive data.

The hardware configuration of the device 301 will be described next with reference to FIG. 4.

Figure 4:
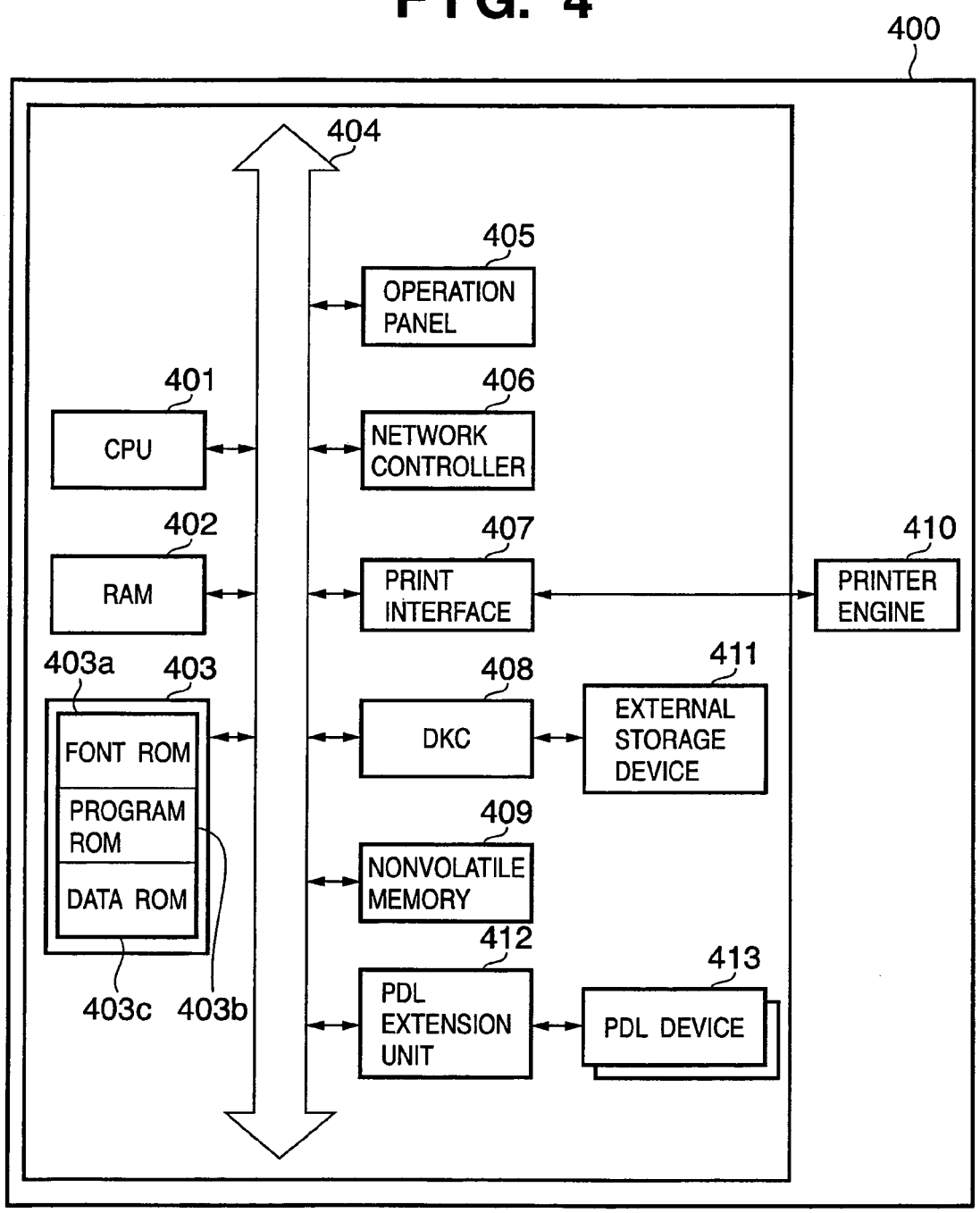
FIG. 4 is a block diagram showing the hardware configuration of a device according to the first embodiment of the present invention.

FIG. 4 is a block diagram showing the hardware configuration of the device according to the first embodiment of the present invention.

As the device, a laser beam printer 400 serving as an image forming apparatus will be exemplified here.

In the printer 400 shown in FIG. 4, a CPU 401 collectively controls access to various devices connected to a system bus 404 on the basis of a control program stored in a program ROM 403b of a ROM 403. The CPU 401 outputs an image signal as output information to a print unit (printer engine) 410 connected through a print interface 407.

The control program stored in the program ROM 403b includes programs to implement various flowcharts to be described later. The CPU 401 executes various processing operations shown in the flowcharts by executing the programs. The control program stored in the program ROM 403b also includes a program to convert an input PDL (Page Description Language) to bitmap data printable by the printer engine 410. When the program is executed by the CPU 401, the printer 400 functions as an image forming means.

The program ROM 403b of the ROM 403 stores control programs executable by the CPU 401. A font ROM 403a of the ROM 403 stores font data (including outline font data) to be used to generate output information. A data ROM 403c of the ROM 403 stores data to be used on the host computer (e.g., host computer 302).

The CPU 401 can execute communication processing with the host computer on the network 304 through a network controller 406. A RAM 402 mainly functions as the main memory or work area of the CPU 401. The RAM 402 is designed to extend the memory capacity by using an optional RAM connected to an extension port (not shown). The RAM 402 is used as an output information rasterization area or environment data storage area.

Access to an external storage device 411 such as a hard disk (HD) or IC card is controlled by a disk controller (DKC) 408. The external storage device 411 is used as a job storage area to store font data, an emulation program, and form data, temporarily spool a print job, and control the spooled job from the outside.

An operation panel 405 includes, e.g., a touch panel, and various keys and buttons so that the user can input various kinds of information from software keys displayed on the touch panel. A nonvolatile memory 409 stores various kinds of information such as printer mode setting information input from the operation panel 405.

Various extension units such as a finisher to execute stapling and sorting and a double-sided printing unit to implement double-sided printing can be attached to the printer 400 as options. The operations of the units are controlled from the CPU 401.

A PDL extension unit 412 connects at least one PDL device (PDL board) 413 which can be controlled from the CPU 401. The PDL device 413 serves as an image forming unit (image forming means) having a function of interpreting print data (PDL) received from the host computer and converting the data into bitmap data printable by the printer engine 410. At least one PDL device 413 is normally connected. More PDL devices 413 can be added later. Device information defined by IEEE1284 used in plug and play is held by the PDL device 413.

In the first embodiment to be described below, the device is assumed to have PDL1 as the standard PDL device unless otherwise specified. A PDL of another type such as PDL2 can be added and extended as an optional PDL device.

Extension of the PDL device may be done by physically adding an extension board with a dedicated PDL device to the printer 400. If the PDL device is implemented by a program, a corresponding program may be added to the program ROM 403b. A PDL device may be added by storing programs corresponding to a plurality of kinds of PDL devices in the program ROM 403b in advance and validating a necessary PDL device by using a license key input by user operation.

Examples of the PDL are LIPS, PostScript, and PCL.

The detailed arrangement of the host computer 302 or 303 will be described next with reference to FIG. 5.

Figure 5:
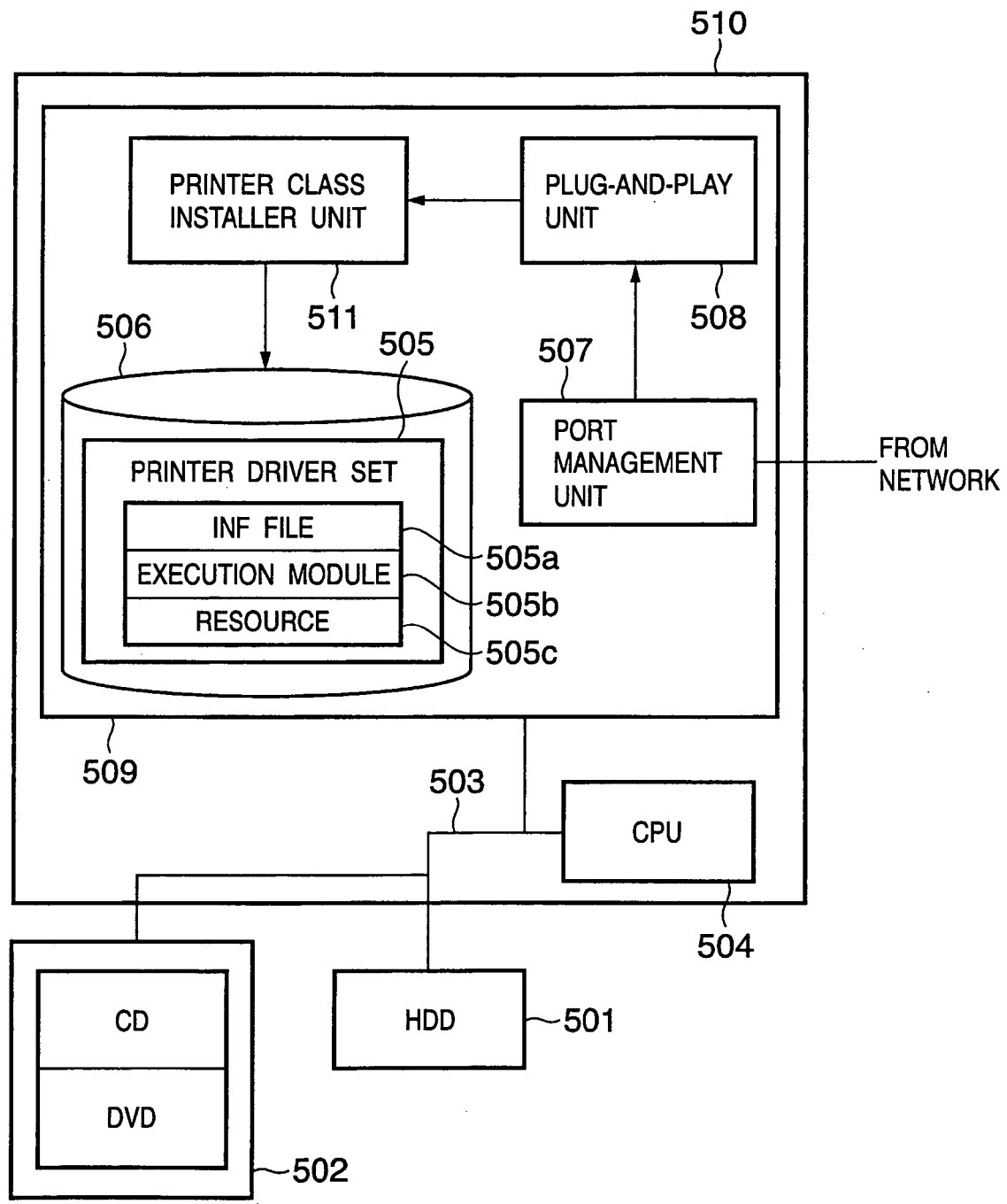
FIG. 5 is a block diagram showing the detailed arrangement of a host computer according to the first embodiment of the present invention.

FIG. 5 is a block diagram showing the detailed arrangement of the host computer according to the first embodiment of the present invention.

In an information processing apparatus 510 corresponding to each of the host computers 302 and 303, an HDD 501 is a hard disk drive with a large capacity. The HDD 501 can store in advance a program module to be loaded to a RAM 509 and a driver set 505 including an INF file. An external storage device 502 including a CD/DVD-ROM/RAM drive also has the same function.

A program module group implemented on the RAM 509 includes a port management unit 507, plug-and-play unit 508, printer class installer unit 511, and at least one printer driver set 505 managed on a driver library 506. The RAM 509 reads out the program modules from the HDD 501 and executes them as needed.

A CPU 504 collectively controls the printer class installer unit 511, plug-and-play unit 508, port management unit 507, and driver library 506, reads out each processing from the HDD 501 to the RAM 509, and executes the processing.

A BUS 503 connects the various constituent elements (CPU 504, RAM 509, HDD 501, and external storage device 502) of the information processing apparatus 510 to each other.

The port management unit 507 controls the interface on the side of the information processing apparatus 510 connected to the network 304 for communication with the device 400. In automatically installing a printer driver, the port management unit 507 receives device information defined by IEEE1284 and transfers it to the plug-and-play unit 508.

The plug-and-play unit 508 is a module to execute information control with a device for plug and play. The plug-and-play unit 508 generates a device ID from the values of MFG and MDL tags in the device information received from the port management unit 507. The plug-and-play unit 508 then transfers the generated device ID to the printer class installer unit 511.

The printer class installer unit 511 is a module to install a printer driver. On the basis of the device ID received from the plug-and-play unit 508, the printer class installer unit 511 searches for a printer driver set corresponding to the device ID from at least one printer driver set 505. When the printer driver set is found, the printer driver is installed and assigned to a necessary port.

The printer driver set 505 includes an execution module group 505b such as a DLL, a resource 505c, and an INF file 505a that describes their features for installation in correspondence with a printer driver.

The sequence of printer driver installation implemented between the information processing apparatus (host computer) 510 and the device (printer) 400 will be described next with reference to FIG. 6.

Figure 6:
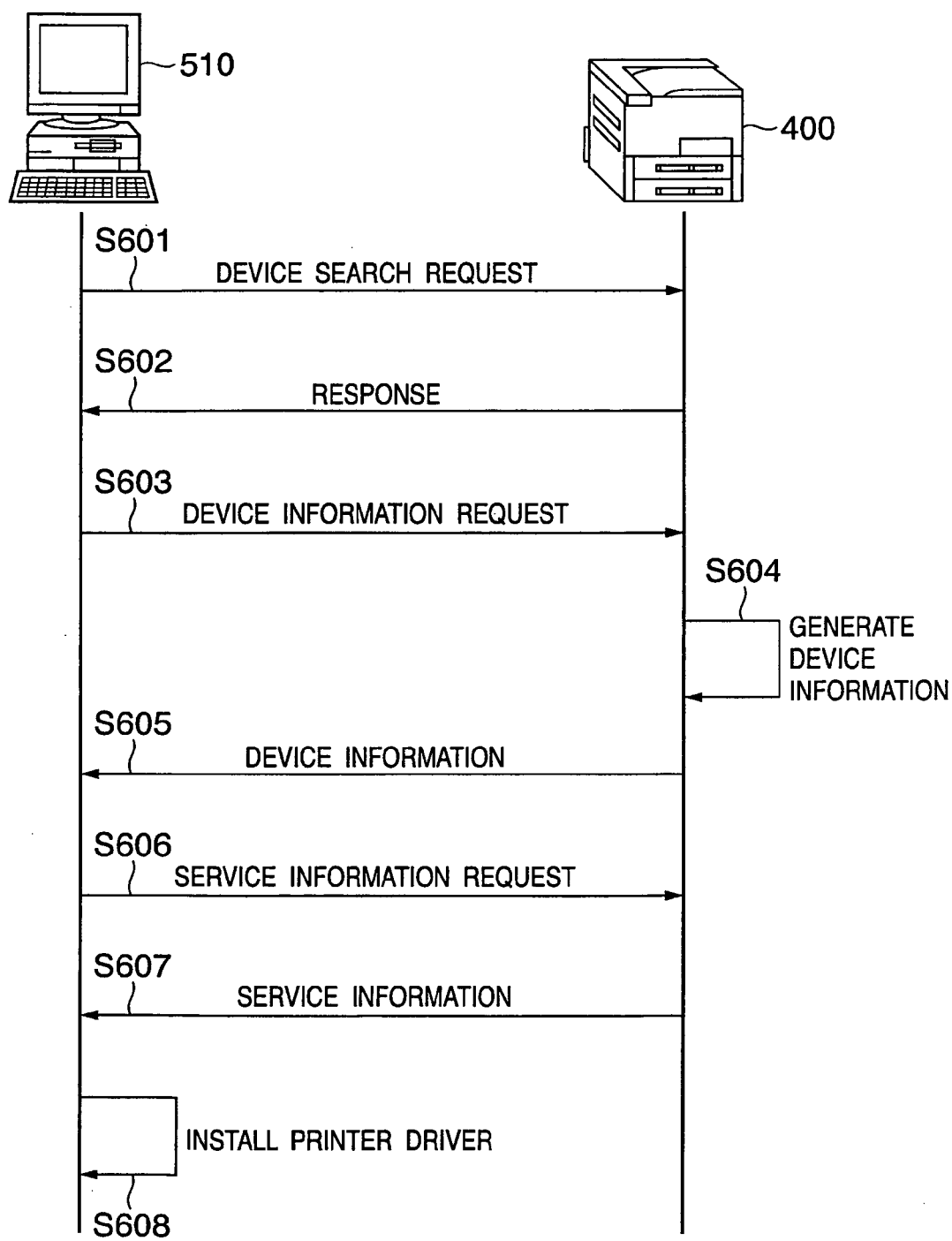
FIG. 6 is a sequence chart of printer driver installation according to the first embodiment of the present invention.

FIG. 6 is a sequence chart of printer driver installation according to the first embodiment of the present invention.

Figure 7:
FIG. 7 is a view showing an example of a device search request according to the first embodiment of the present invention.

In step S601, the information processing apparatus 510 transmits a device search request to the network. The device search request is information described by, e.g., an XML format shown in FIG. 7 and is transmitted using multicast. A <Types> element 701 in FIG. 7 describes the type of device as the search target. For example, the type of function such as a print service or scan service or the type of PDL device such as a print service with PDL1 can be described.

All devices existing in the multicast reachable range receive the device search request. Each device determines in accordance with the flowchart in FIG. 8 to be described later whether the device responds to this request.

For example, if the device 400 determines that the device 400 responds, the device 400 transmits a response to the device search request to the information processing apparatus 510 in step S602. In step S603, the information processing apparatus 510 transmits a device information request to the found device (the device that has transmitted the response). If the device 400 should notify that it has participated in the network, the device 400 transmits the network participation notification to the information processing apparatus 510 instead of the processing in steps S601 and S602. In step S603, the information processing apparatus 510 transmits a device information request to the device on the basis of the network participation notification from the device 400.

Upon receiving the device information request, the device 400 generates device information by a method (to be described later) in step S604. In step S605, the generated device information is transmitted to the information processing apparatus 510.

The device information (identification information) is described in, e.g., an XML format shown in FIG. 9 and contains a list of services provided by the device. The value of a <ServiceID> element 901 in FIG. 9 indicates a unique ID (service ID), i.e., an identifier to identify each service and is used to specify a necessary service later.

In the first embodiment, when an optional PDL device is added to the device, only one print service to use the added PDL is assumed to be set in the service list. However, the present invention is not limited to this.

Figure 10:
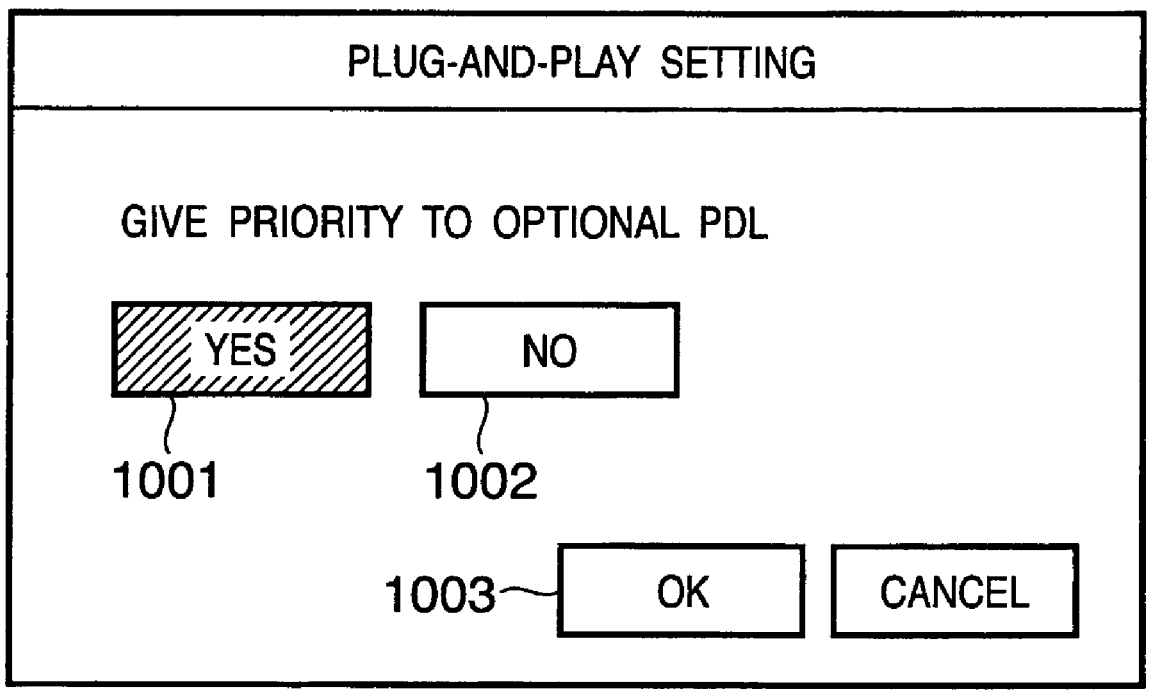
FIG. 10 is a view showing an example of a plug-and-play setting window on an operation panel according to the first embodiment of the present invention.

For example, print services of all the PDL devices provided in the device may be listed by changing settings using a plug-and-play setting window displayed on the operation panel 405 of the device 400 as shown in FIG. 10. In the example shown in FIG. 10, a "YES" button 1001 to give priority to an optional PDL device is selected in the initial state. On the other hand, when the user selects a "NO" button 1002 and operates an "OK" button 1003, the settings can appropriately be changed.

In step S606, the information processing apparatus 510 designates a necessary service ID from the received device information and transmits a service information request. Upon receiving the service information request, the device 400 acquires the value of device information from a PDL device corresponding to the designated service ID and transmits service information containing the value to the information processing apparatus 510 in step S607. The service information is described in, e.g., an XML format shown in FIG. 11.

In step S608, the information processing apparatus 510 refers to the service information received from the device 400 and installs a corresponding printer driver. If the device 400 transmits device information containing a plurality of service lists to the information processing apparatus 510 in step S605, steps S606 to S608 are repeated. Printer drivers equal in number to the listed services are installed.

Determination processing of determining whether the device 400 that has received the device search request responds to this request in the sequence shown in FIG. 6 will be described next with reference to FIG. 8.

Figure 8:
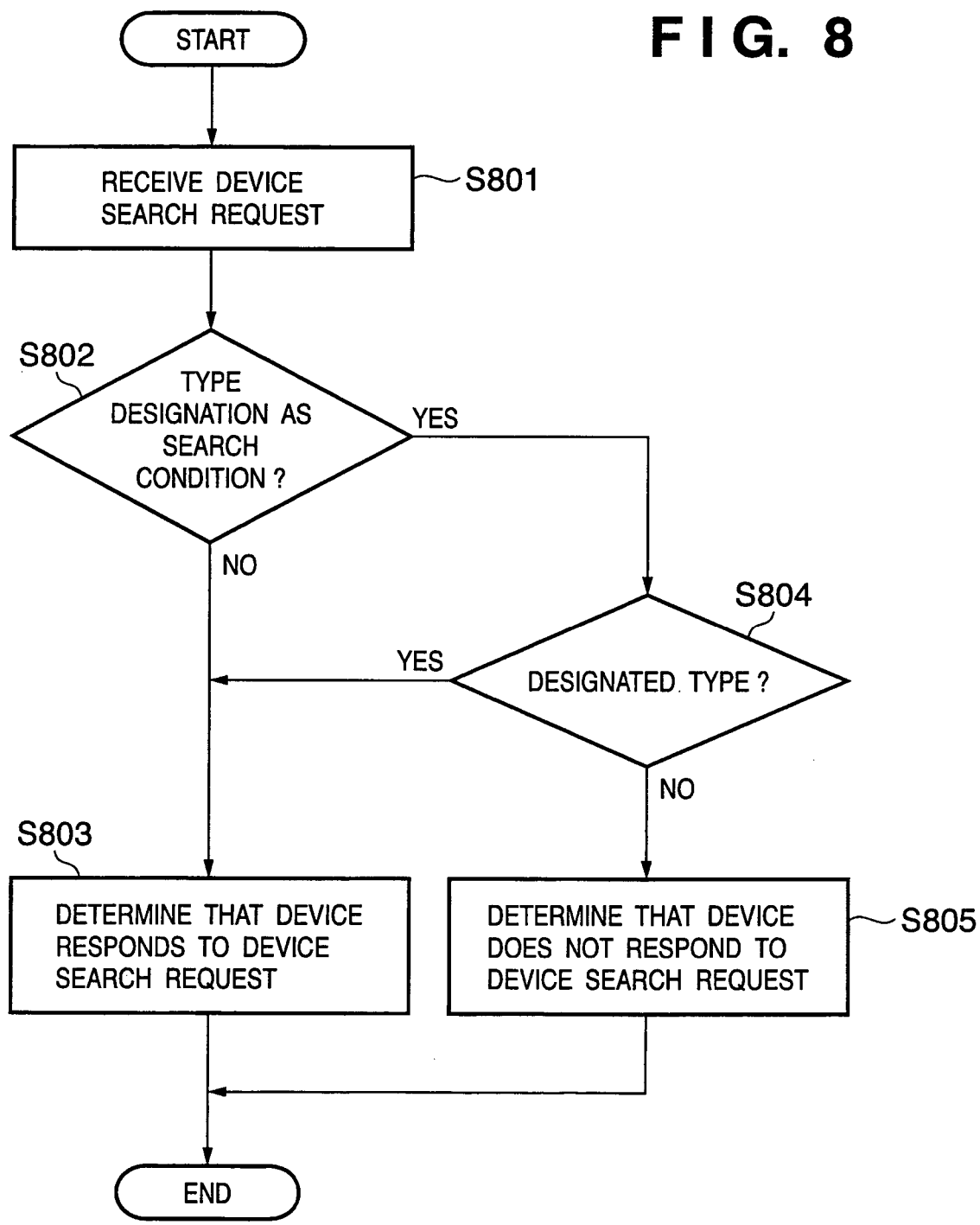
FIG. 8 is a flowchart showing determination processing according to the first embodiment of the present invention.

FIG. 8 is a flowchart showing determination processing according to the first embodiment of the present invention.

In step S801, the device 400 receives a device search request. In step S802, the presence/absence of type designation by a <Types> tag in the device search request is determined as the search condition. If no type is designated (NO in step S802), the received device search request indicates exhaustive device search. The process advances to step S803 to determine that the device 400 responds to the device search request.

If a type is designated (YES in step S802), the process advances to step S804 to determine whether the designated type is included in the type of the device itself. If the designated type is included in the type of the device itself (YES in step S804), the process advances to step S803. If the designated type is not included in the type of the device itself (NO in step S804), the process advances to step S805 to determine that the device 400 does not respond to the device search request.

The type of the device itself used for determination in step S804 indicates the PDL device attached to the device 400 and service name information of the service of the PDL device, as shown in FIG. 12. The device 400 detects a PDL device attached to itself, generates service name information on the basis of the detection result, and holds the generated information in the RAM 402, as needed. The device 400 may execute this processing when powering on the image forming apparatus or when it becomes possible to add and use an optional PDL by a license key, or before performing processing shown in FIG. 13. In this case, as shown in FIG. 12, the device manages each PDL device as one PrintService and assigns a service ID to each service in the service list information.

Generation processing of causing the device to generate a service list contained in device information in step S604 of the sequence shown in FIG. 6 will be described next with reference to FIG. 13.

Figure 13:
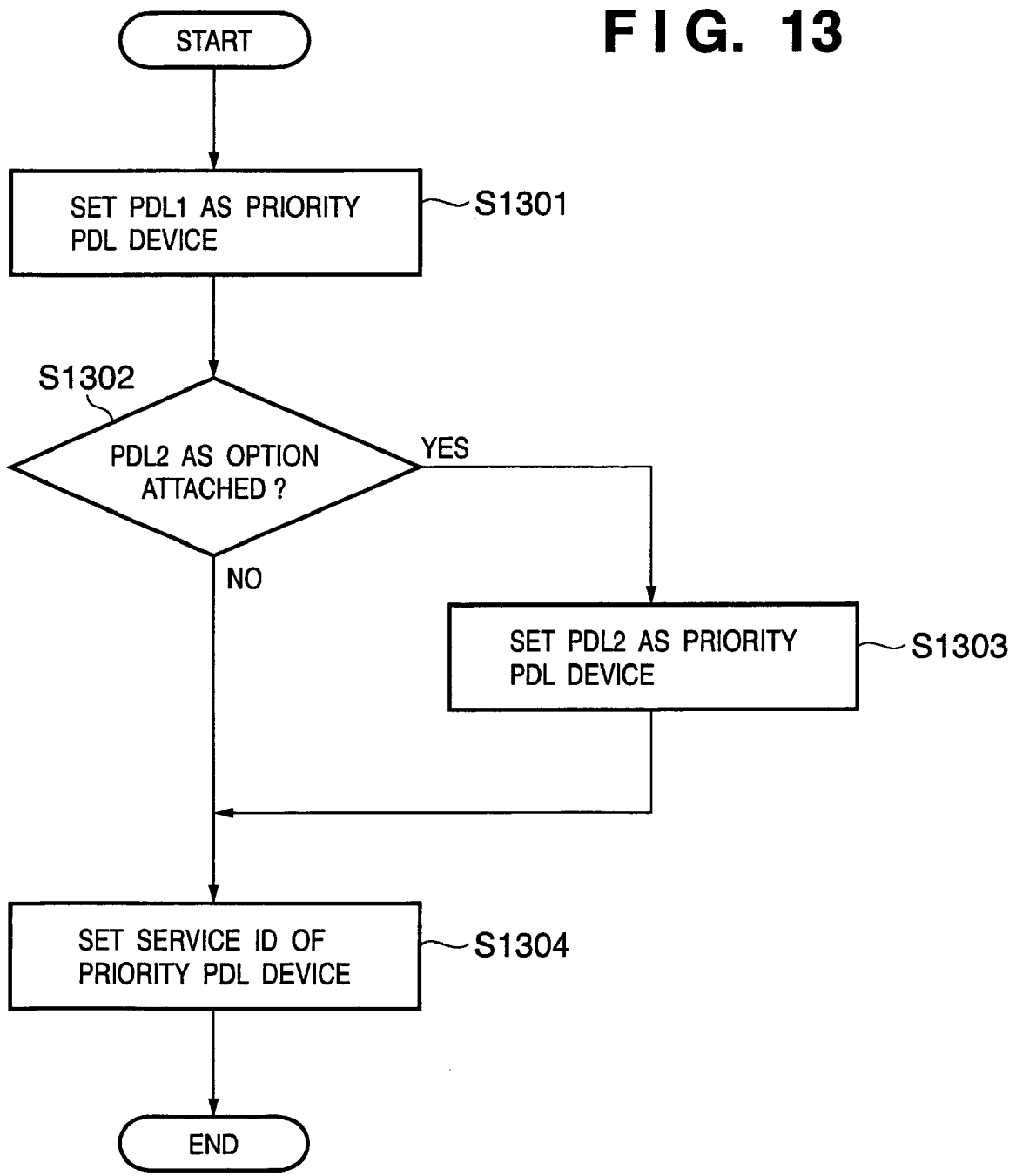
FIG. 13 is a flowchart showing generation processing according to the first embodiment of the present invention.

FIG. 13 is a flowchart showing generation processing according to the first embodiment of the present invention.

In step S1301, PDL1 as the standard PDL device of the device 400 is set as a priority PDL device. It is determined in step S1302 whether PDL2 is attached to the device 400 as an optional PDL device. If PDL2 is additionally attached (YES in step S1302), the process advances to step S1303 to set PDL2 as a priority PDL device. Then, the process advances to step S1304.

If, for example, an optional PDL device is implemented by a physical extension board, whether an optional PDL device is additionally attached is determined on the basis of the number of available slots in the device to accommodate extension boards. If an optional PDL device is implemented by a program, the determination is done by referring to the contents of the RAM 402 which stores a flag representing a valid optional PDL device.

If an image forming apparatus is of a type which allows to add and use PDL2 as an option by a license key, it is determined in step S1302 whether PDL2 as an option can be added and used. If PDL2 as an option can be added and used (YES in step S1302), the process advances to step S1303 to set PDL2 as a priority PDL device. Then, the process advances to step S1304.

If PDL2 is not additionally attached (NO in step S1302), the process advances to step S1304.

The service ID corresponding to the set priority PDL device is acquired from the service name information (FIG. 12) and set as the value of <ServiceID> in the device information. As a result, only one service is set in the service list of the device information, irrespective of whether PDL2 is attached.

Figure 14:
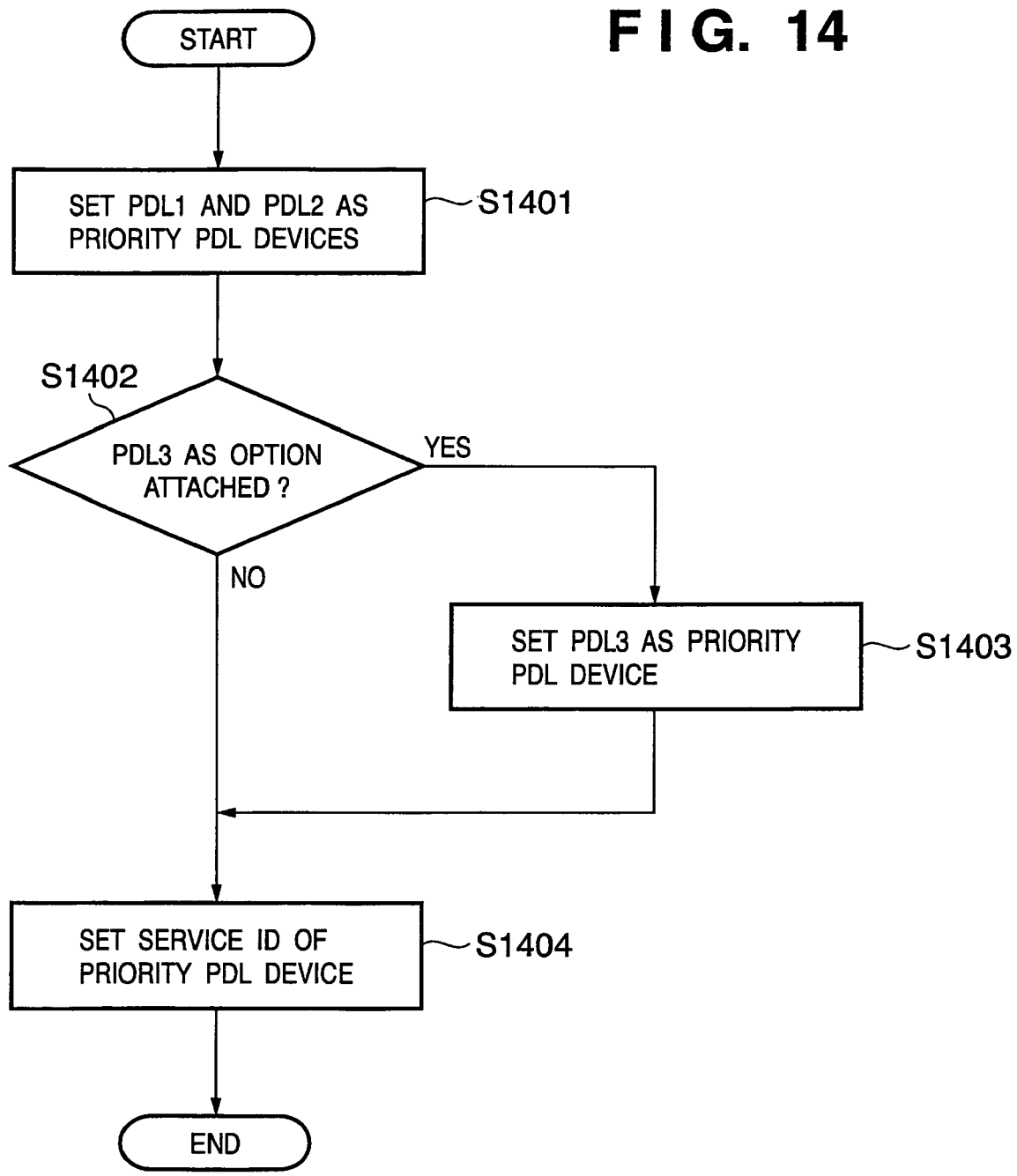
FIG. 14 is a flowchart showing another generation processing according to the first embodiment of the present invention.

When the device includes PDL1 and PDL2 as the standard PDL devices, and PDL3 can be added and extended as an optional PDL device, the processing shown in FIG. 12 is performed as shown in FIG. 14.

If a plurality of optional PDL devices are attached, the nonvolatile memory 409 holds, as log information, the addition date/time every time an optional PDL device is added. On the basis of the log information held in the nonvolatile memory 409, an optional PDL device added latest is set as a priority PDL device. The processing shown in FIG. 13 may be performed at the timing of step S604 (FIG. 6) or when powering on the image forming apparatus or when it becomes possible to add and use an optional PDL device by a license key.

FIG. 14 is a flowchart showing generation processing according to the first embodiment of the present invention.

In step S1401, PDL1 and PDL2 as the standard PDL devices of the device 400 are set as priority PDL devices. It is determined in step S1402 whether PDL3 as an optional PDL device is attached to the device 400. If PDL3 is additionally attached (YES in step S1402), the process advances to step S1403 to set PDL3 as a priority PDL device. Then, the process advances to step S1404.

If PDL3 is not additionally attached (NO in step S1402), the process advances to step S1404.

In step S1404, the service ID corresponding to the set priority PDL device is acquired from the service name information (FIG. 12) and set as the value of <ServiceID> in the device information. As a result, two services are set in the service list of the device information if PDL3 is not attached. If PDL3 is attached, one service is set in the service list of the device information.

As described above, according to the first embodiment, in response to a search request for a PDL device from an information processing apparatus, an image forming apparatus automatically selects a suitable PDL device to be preferentially used, and notifies the information processing apparatus of device information representing the selection result. Hence, an information processing apparatus can install a printer driver desired by a user, thus increasing the convenience for the user.

In view of this, the arrangement of the first embodiment is especially effective when an optional PDL device is additionally attached to an image forming apparatus. This is because an optional PDL device is assumed to be added when the user wants to positively use it. That is, under the circumstance, the information processing apparatus can set not the standard PDL device but an optional PDL as a priority PDL to be preferentially used, thus building an environment desired by the user.

Second Embodiment

In the second embodiment, when a device search request designates the type of one of PDL devices in the sequence shown in FIG. 6, an image forming apparatus stores host information (identification information) representing a source information processing apparatus. Upon receiving a device information request, the image forming apparatus compares host information in the request with the host information stored in the apparatus and selects a priority PDL on the basis of the comparison result. This arrangement will be described.

Especially, according to the arrangement of the second embodiment, for an information processing apparatus 510 that has designated and searched for a specific PDL device, the specific PDL device can be set as a priority PDL device. In other words, an information processing apparatus can install a printer driver corresponding to a PDL device designated in device search, irrespective of a priority PDL device set by a device 400.

Determination processing of determining whether the device 400 that has received a device search request responds to this request in the sequence shown in FIG. 6 according to the arrangement of the second embodiment will be described next with reference to FIG. 15.

Figure 15:
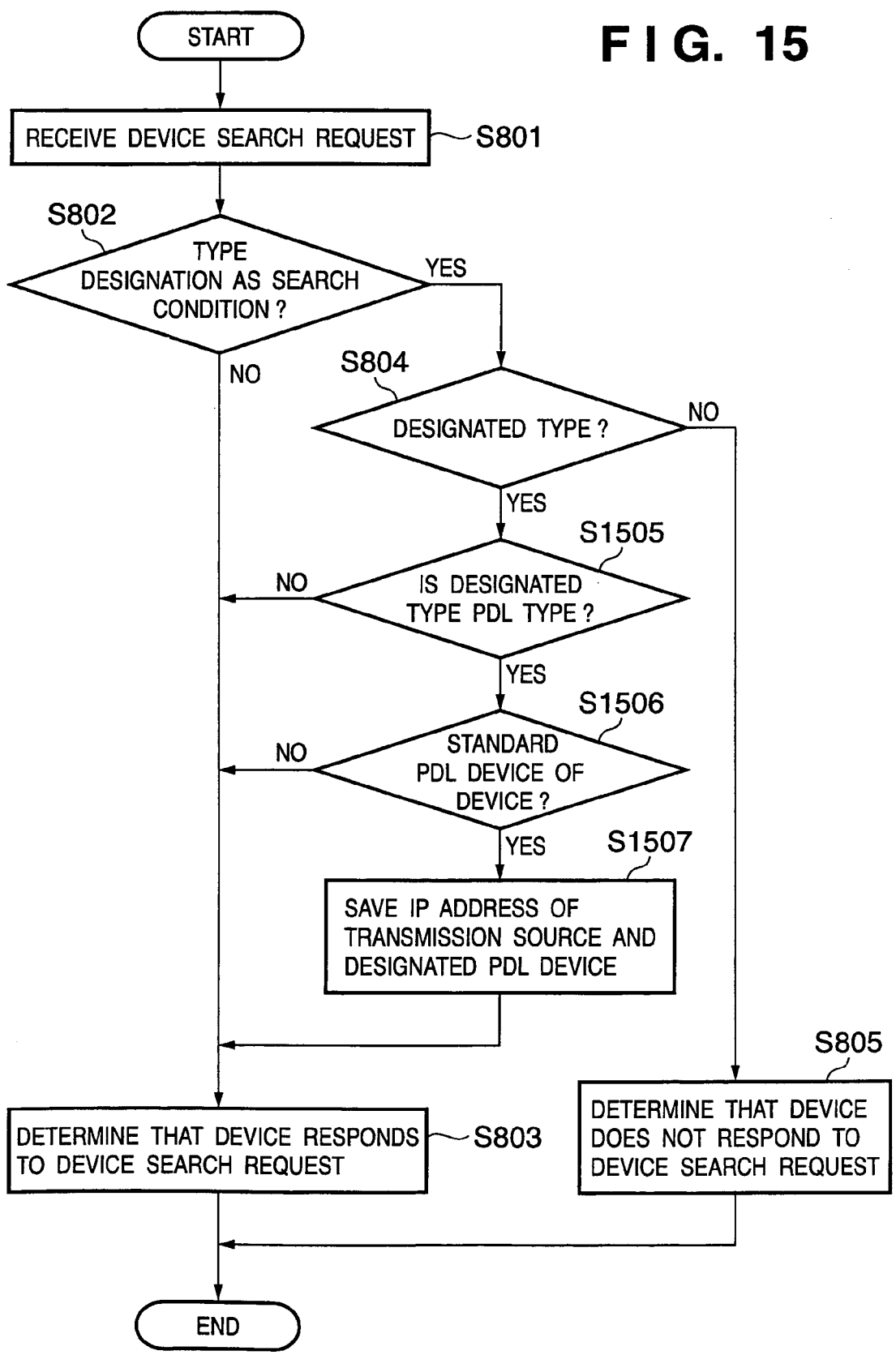
FIG. 15 is a flowchart showing determination processing according to the second embodiment of the present invention.

FIG. 15 is a flowchart showing determination processing according to the second embodiment of the present invention.

The same step numbers as in FIG. 8 of the first embodiment denote the same steps in FIG. 15, and a detailed description thereof will be omitted.

If it is determined in step S804 that a type is designated (YES in step S804), the process advances to step S1505 to determine whether the designated type is a PDL type. If the designated type is not a PDL type (NO in step S1505), the process advances to step S803. If the designated type is a PDL type (YES in step S1505), the process advances to step S1506 to determine whether the designated PDL device is the standard PDL device of the device 400.

If the designated PDL device is not the standard PDL device of the device 400 (NO in step S1506), the process advances to step S803. If the designated PDL device is the standard PDL device of the device 400 (YES in step S1506), the process advances to step S1507. In step S1507, a RAM 402 saves, as search log information, the IP address of an information processing apparatus 510 that has transmitted a device search request, and the PDL designated as the search condition. Then, the process advances to step S803.

An example of search log information will be described here with reference to FIG. 16.

FIG. 16 is a view showing an example of search log information according to the second embodiment of the present invention.

The search log information shown in FIG. 16 manages the names of PDL devices designated by device search requests in correspondence with pieces of address information (IP addresses) of information processing apparatuses (host computers) that have issued these requests. That is, the search log information manages information representing the correspondence between the names of PDL devices designated by device search requests and pieces of address information of information processing apparatuses which have issued these requests.

Especially FIG. 16 indicates that device search requests each of which designates "PDL1" as the search condition are received from information processing apparatuses with IP addresses "192.168.0.2" and "192.168.0.3".

Generation processing of causing the device to generate a service list contained in device information in step S604 of the sequence shown in FIG. 6 will be described next with reference to FIG. 17.

Figure 17:
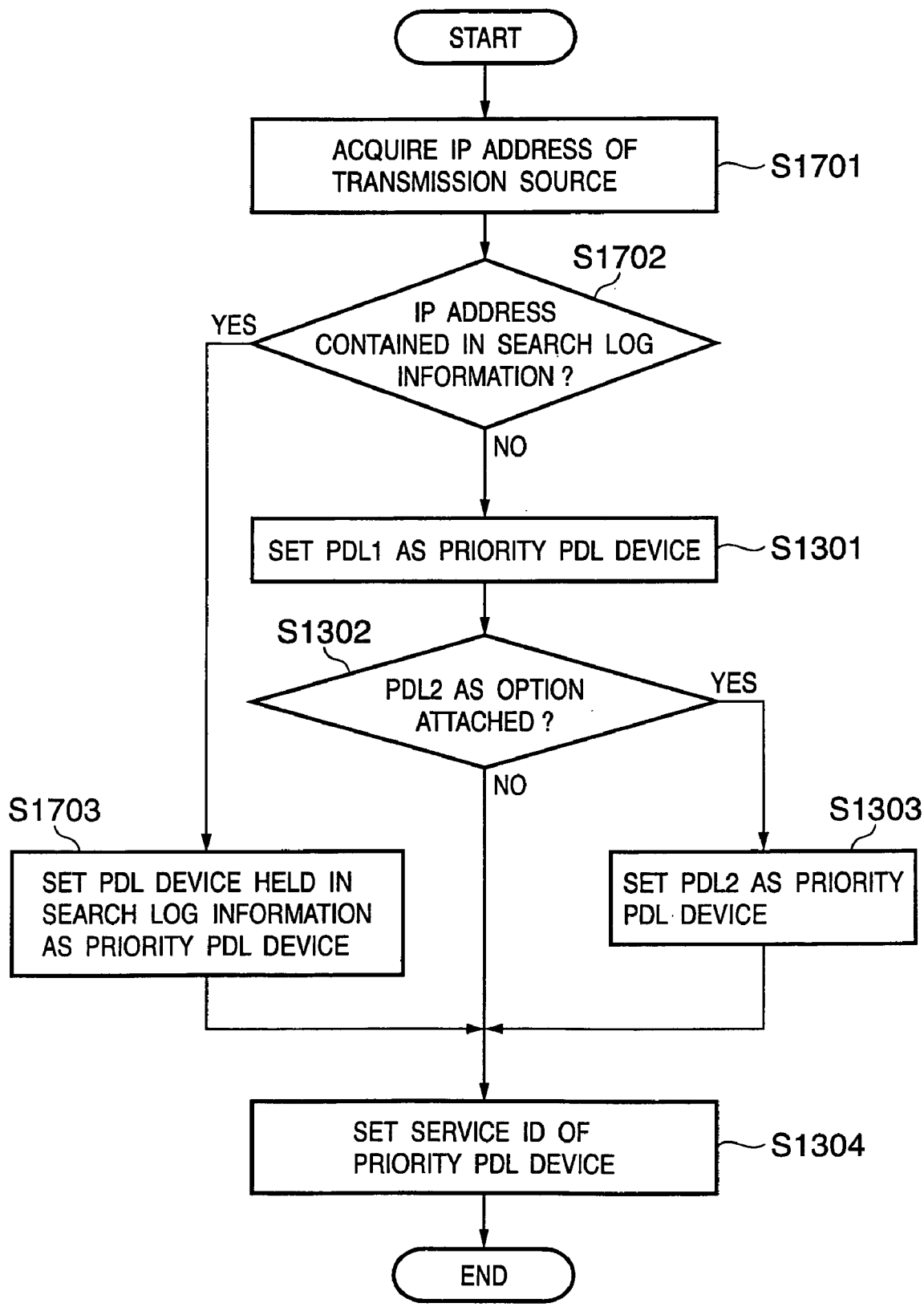
FIG. 17 is a flowchart showing generation processing according to the second embodiment of the present invention.

FIG. 17 is a flowchart showing generation processing according to the second embodiment of the present invention.

The same step numbers as in FIG. 13 of the first embodiment denote the same steps in FIG. 17, and a detailed description thereof will be omitted.

Upon receiving a device information request from an information processing apparatus 510, the device 400 acquires the IP address of the information processing apparatus of the transmission source from the received device information request in step S1701. It is determined in step S1702 whether the IP address acquired in step S1701 is contained in the search log information saved in the RAM 402. If the IP address is contained in the search log information (YES in step S1702), the process advances to step S1703 to set, as a priority PDL device, the PDL device corresponding to the IP address of the information processing apparatus held in the search log information. Then, the process advances to step S1304.

If the IP address is not contained in the search log information (NO in step S1702), the process advances to step S1301. After the processing operations in steps S1301 to S1303, the service ID corresponding to the set priority PDL device is acquired from the service name information (FIG. 12) and set as the value of <ServiceID> in the device information in step S1304. As a result, only one service is set in the service list of the device information, irrespective of whether PDL2 is attached.

As described above, according to the second embodiment, when an image forming apparatus includes, as the standard PDL device, a PDL device designated by a device search request, it stores identification information (e.g., an IP address) of the information processing apparatus that has issued the request as log information. If an information processing apparatus with identification information which matches the stored identification information has issued a device information request, the image forming apparatus selects a PDL device indicated by the log information as a priority PDL device and notifies the information processing apparatus of device information representing the selection result. Hence, an information processing apparatus can install a printer driver desired by a user, thus increasing the convenience for the user.

The arrangement of the second embodiment is especially effective when the user of an information processing apparatus explicitly designates a PDL device to be used and issues a device search request. This is because an image forming apparatus having the designated PDL device is preferentially used.

Third Embodiment

In the third embodiment, a device also serves to store use log information of PDL devices actually used for printing. In response to a device search request issued afterward from an information processing apparatus, an image forming apparatus selects, as a priority PDL device, a most frequently used PDL device which has been found as a result of the use log information. This arrangement will be described.

Especially, according to the arrangement of the third embodiment, an information processing apparatus can install a printer driver corresponding to a most frequently used PDL device in the network environment provided with the device.

Print processing executed by a device according to the arrangement of the third embodiment will be described with reference to FIG. 18.

Figure 18:
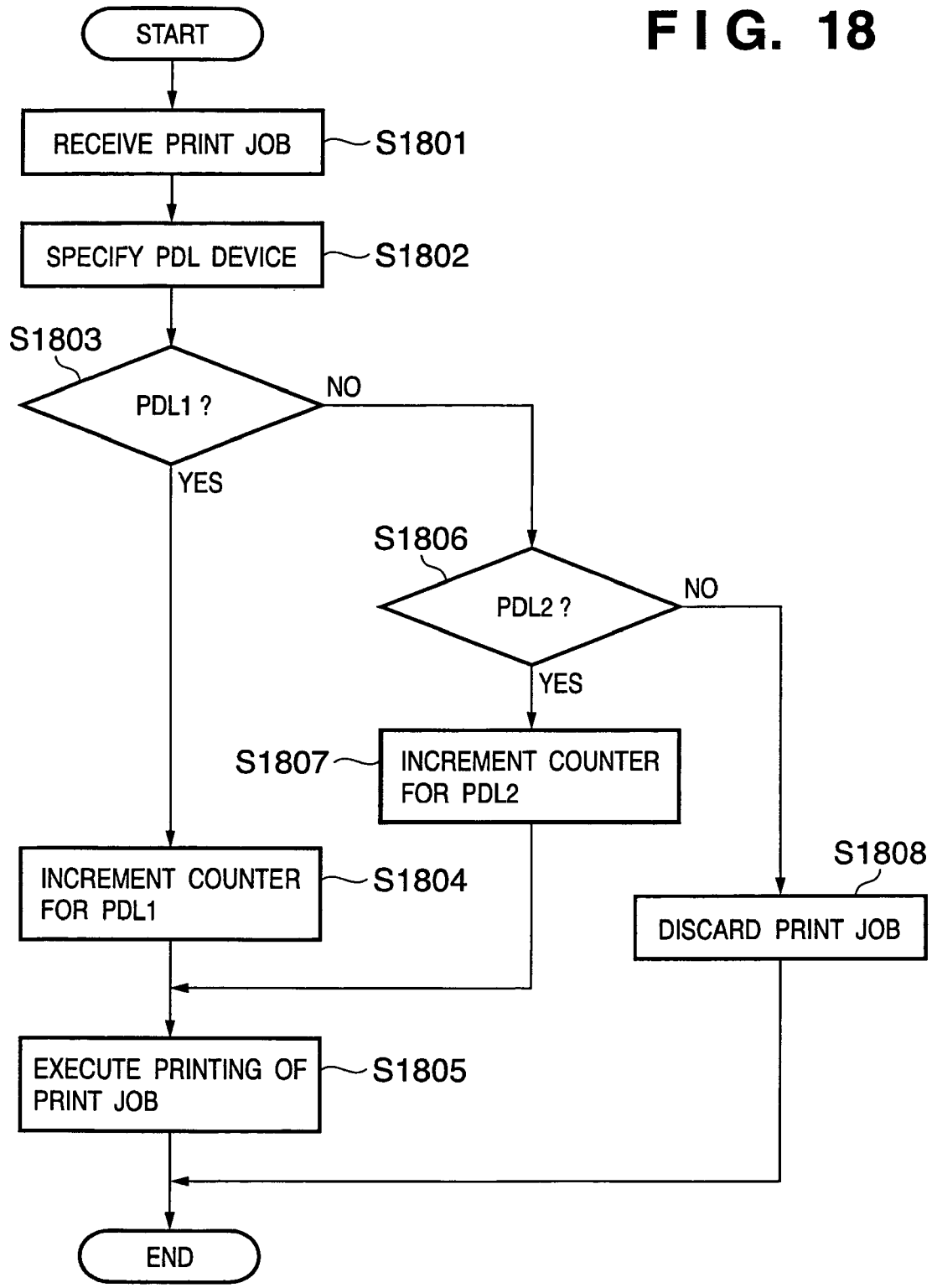
FIG. 18 is a flowchart showing print processing according to the third embodiment of the present invention.

FIG. 18 is a flowchart showing print processing according to the third embodiment of the present invention.

In step S1801, a device 400 receives a print job from an information processing apparatus 510. In step S1802, the device 400 analyzes the print job and specifies a PDL device in use. The device 400 determines in step S1803 whether the specified PDL device is PDL1. If the specified PDL device is PDL1 (YES in step S1803), the process advances to step S1804 to increment a counter for PDL1 by one. In step S1805, the device 400 prints the print job, completing the processing.

If the specified PDL device is not PDL1 (NO in step S1803), the process advances to step S1806 to determine whether the specified PDL device is PDL2. If the specified PDL device is PDL2 (YES in step S1806), the process advances to step S1807 to increment a counter for PDL2 by one. In step S1805, the device 400 prints the print job, completing the processing.

If the specified PDL device is not PDL2 (NO in step S1806), the process advances to step S1808. The device 400 discards the print job, completing the processing.

The counter for each PDL is held in, e.g., a nonvolatile memory 409 and is not cleared even after reactivating the device.

Generation processing of causing the device to generate a service list contained in device information in step S604 of the sequence shown in FIG. 6 will be described next with reference to FIG. 19.

Figure 19:
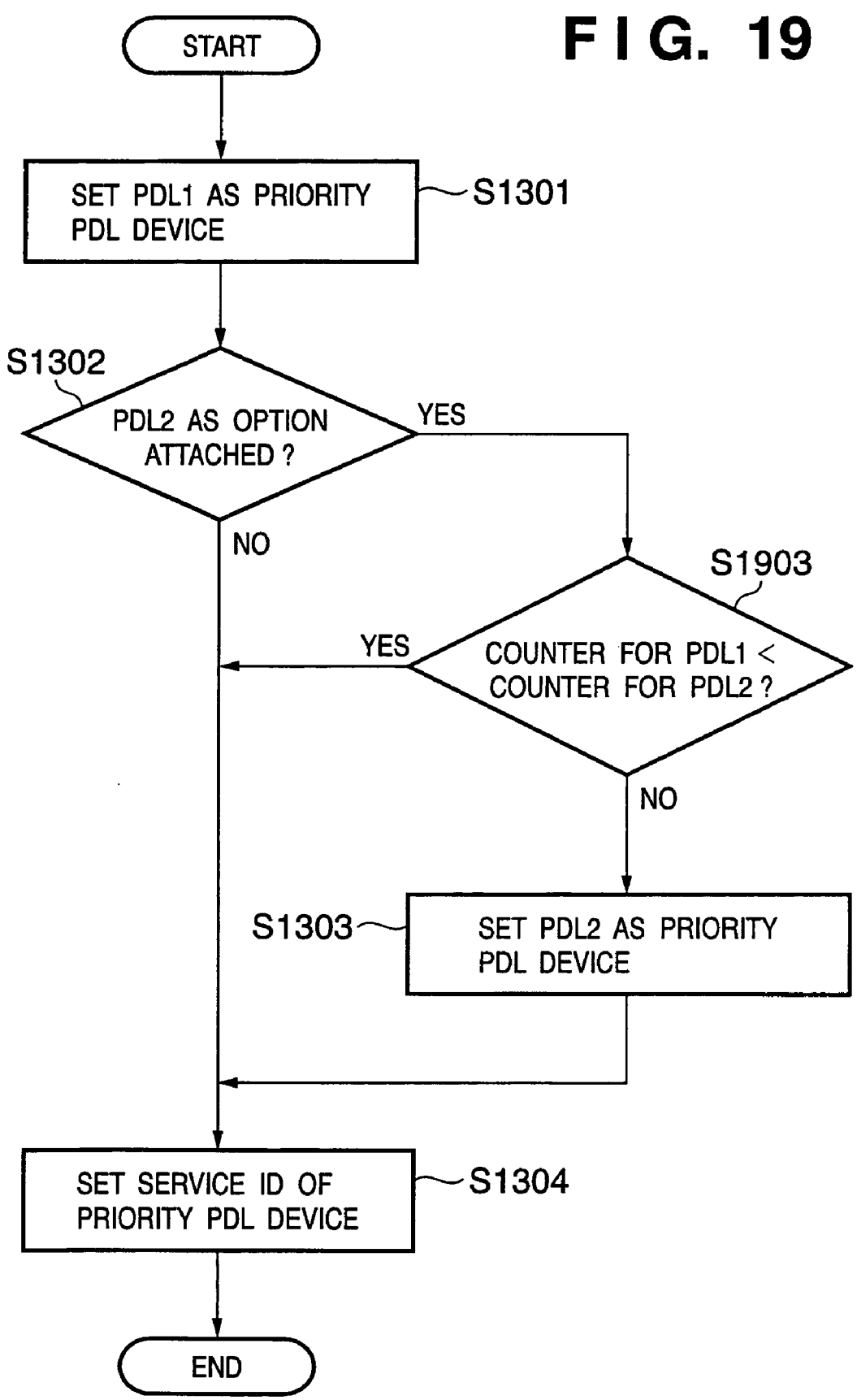
FIG. 19 is a flowchart showing generation processing according to the third embodiment of the present invention.

FIG. 19 is a flowchart showing generation processing according to the third embodiment of the present invention.

The same step numbers as in FIG. 13 of the first embodiment denote the same steps in FIG. 19, and a detailed description thereof will be omitted.

After the processing in step S1301, if it is determined in step S1302 that PDL2 is additionally attached (YES in step S1302), the process advances to step S1903.

It is determined in step S1903 whether the value of the counter for PDL1 is smaller than that of the counter for PDL2. If the value of the counter for PDL1 is smaller than that of the counter for PDL2 (YES in step S1903), the process advances to step S1304. If the value of the counter for PDL1 is equal to or larger than that of the counter for PDL2 (NO in step S1903), the process advances to step S1303.

With the above-described processing, the service ID corresponding to the set priority PDL device is acquired from the service name information (FIG. 12) and set as the value of <ServiceID> in the device information in step S1304. As a result, only one service is set in the service list, irrespective of whether PDL2 is attached.

As described above, according to the third embodiment, the use frequency of each PDL device in an image forming apparatus is managed as use log information. On the basis of the use log information, the image forming apparatus automatically selects a suitable PDL device to be preferentially used, and notifies an information processing apparatus of device information representing the selection result. Hence, the information processing apparatus can install a printer driver desired by a user, thus increasing the convenience for the user.

In the third embodiment, a most frequently used PDL device out of PDL devices, which has been found as a result of the use log information, is selected as a priority PDL device. However, the present invention is not limited to this. For example, if the user wants to use PDL devices with an equal frequency or to distribute loads, a least frequently used PDL device may be selected as a priority PDL device.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function extension board inserted into the computer or to a memory provided in a function extension unit connected to the computer, a CPU or the like mounted on the function extension board or function extension unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-255618 filed on Sep. 2, 2005, which is hereby incorporated by reference herein in its entirety.

What is claimed is:

1. An image forming apparatus which is connected to a network and can communicate with an information processing apparatus on the network, comprising:
   a plurality of image forming means, each of which processes a different PDL (Page Description Language);
   decision means for deciding a priority image forming means from said plurality of image forming means in accordance with states of image forming means;
   transmission means for transmitting, in response to an information request transmitted from the information processing apparatus, identification information containing an identifier of said image forming means decided by said decision means so that the information processing apparatus installs a device driver corresponding to the decided priority image forming means;
   reception means for receiving a search request from the information processing apparatus;
   response means for interpreting a type designated by the search request and making a response only when the image forming apparatus includes the type; and
   storage means for, if the type designated by the search request indicates a type of said image forming means, storing correspondence information representing a correspondence between type information representing the designated type and identification information representing an information processing apparatus which has transmitted the search request,
   wherein said decision means decides, as the priority image forming means from said plurality of image forming means, an image forming means that is added and extended to the image forming apparatus as an option, and
   wherein if an information processing apparatus which has transmitted the information request exists in the correspondence information stored in said storage means, said decision means does not decide, as the priority image forming means, an image forming means which is added and extended to the image forming apparatus as the option, but decides an image forming means corresponding to the type designated by said search request.

2. The apparatus according to claim 1, further comprising designation means for designating priority image forming means from said plurality of image forming means,
   wherein said decision means decides, as priority image forming means from said plurality of image forming means, said image forming means designated by said designation means.

3. An image forming system formed by connecting an image forming apparatus to an information processing apparatus through a network, comprising:
   the image forming apparatus comprising:
   a plurality of image forming means, each of which processes a different PDL (Page Description Language);
   decision means for deciding a priority image forming means from said plurality of image forming means in accordance with states of image forming means;
   transmission means for transmitting, in response to an information request transmitted from the information processing apparatus, identification information containing an identifier of said image forming means decided by said decision means so that the information processing apparatus installs a device driver corresponding to the priority image forming means;
   reception means for receiving a search request from the information processing apparatus;
   response means for interpreting a type designated by the search request and making a response only when the image forming apparatus includes the type; and
   storage means for, if the type designated by the search request indicates a type of said image forming means, storing correspondence information representing a correspondence between type information representing the designated type and identification information representing an information processing apparatus which has transmitted the search request,
   wherein said transmission means transmits, as a priority image forming means selected from said plurality of image forming means, an image forming means which is added and extended to the image forming system as an option, and
   wherein if an information processing apparatus which has transmitted the information request exists in the correspondence information stored in said storage means, said decision means does not decide, as the priority image forming means, an image forming means which is added and extended to the image forming apparatus as the option, but decides an image forming means corresponding to the type designated by said search request; and
   the information processing apparatus comprising:
   reception means for receiving the identification information from the image forming apparatus; and
   installation means for installing, on the basis of the identification information received by said reception means, a device driver to use the image forming apparatus.

4. A control method of an image forming apparatus which is connected to a network and can communicate with an information processing apparatus on the network, comprising:
   a decision step of deciding, in accordance with states of image forming means, a priority image forming means from a plurality of image forming means, each of which processes a different PDL (Page Description Language) and is provided in the image forming apparatus;

a transmission step of transmitting, in response to an information request transmitted from the information processing apparatus, identification information containing an identifier of the image forming means decided so that the information processing apparatus installs a device driver corresponding to the priority image forming means decided in the decision step;

a reception step for receiving a search request from the information processing apparatus;

a response step for interpreting a type designated by the search request and making a response only when the image forming apparatus includes the type; and a storage step for, if the type designated by the search request indicates a type of said image forming means, storing correspondence information representing a correspondence between type information representing the designated type and identification information representing an information processing apparatus which has transmitted the search request, wherein said transmission step transmits, as the priority image forming means decided in the decision step, an image forming means which is added and extended to the image forming apparatus as an option in the decision step, and wherein if an information processing apparatus which has transmitted the information request exists in the correspondence information stored in said storage step, said decision step does not decide, as the priority image forming means, an image forming means which is added and extended to the image forming apparatus as the option, but decides an image forming means corresponding to the type designated by said search request.

5. A computer-readable storage medium storing a computer-executable program which causes a computer to execute control of an image forming apparatus which is connected to a network and can communicate with an information processing apparatus on the network, causing the computer to execute:

a decision step of deciding, in accordance with states of image forming means, a priority image forming means from a plurality of image forming means, each of which processes a different PDL (Page Description Language) and is provided in the image forming apparatus;

a transmission step of transmitting, in response to an information request transmitted from the information processing apparatus, identification information containing an identifier of the image forming means decided in the decision step so that the information processing apparatus installs a device driver corresponding to the priority image forming means decided in the decision step;

a reception step of receiving a search request from the information processing apparatus;

a response step of interpreting a type designated by the search request and making a response only when the image forming apparatus includes the type; and a storage step of, if the type designated by the search request indicates a type of said image forming means, storing correspondence information representing a correspondence between type information representing the designated type and identification information representing an information processing apparatus which has transmitted the search request, wherein said decision step decides, as the priority image forming means from said plurality of image forming means, an image forming means which is added and extended to the image forming means as an option, and wherein if an information processing apparatus which has transmitted the information request exists in the correspondence information stored in said storage step, said decision step does not decide, as the priority image forming means, an image forming means which is added and extended to the image forming apparatus as the option, but decides an image forming means corresponding to the type designated by said search request.

* * * * *